United States Patent

White et al.

[15] 3,638,462
[45] Feb. 1, 1972

[54] COINCIDENTAL LOCK

[72] Inventors: Robert L. White, Frankenmuth; John W. Creed, Jr., Saiginaw, both of Mich.

[73] Assignee: General Motors Corporation, Detroit, Mich.

[22] Filed: Nov. 18, 1970

[21] Appl. No.: 90,622

[52] U.S. Cl. .................................................70/186, 70/252
[51] Int. Cl. ............................................................B60r 25/02
[58] Field of Search ................................70/186, 211, 252

[56] References Cited

UNITED STATES PATENTS

| | | | |
|---|---|---|---|
| 1,831,300 | 11/1931 | Geyer | 70/252 |
| 2,036,776 | 4/1936 | Rubner | 70/252 |
| 3,572,067 | 3/1971 | Kimberlin et al. | 70/252 |

*Primary Examiner*—Albert G. Craig, Jr.
*Attorney*—W. E. Finken and D. L. Ellis

[57] ABSTRACT

A coincidental lock adapted for vehicle steering column applications includes a steering shaft lock bolt movable between locking and unlocking positions, lock means operable by a key to move the lock bolt between its positions, and inhibitor means operable to prevent locking movement of the lock bolt as long as the key is inserted in the lock means, the inhibitor means including an inhibitor pin, a slipring, a key bezel rotatable with the key, cam means on the key bezel engageable on the slipring, and means connecting the slipring and the inhibitor pin. The key, when inserted in the bezel, displaces the cam means to a position depressing the slipring and the latter, when so depressed, functions to yieldingly urge the inhibitor pin to a position preventing locking movement of the lock bolt once the latter achieves the unlocking position.

3 Claims, 6 Drawing Figures

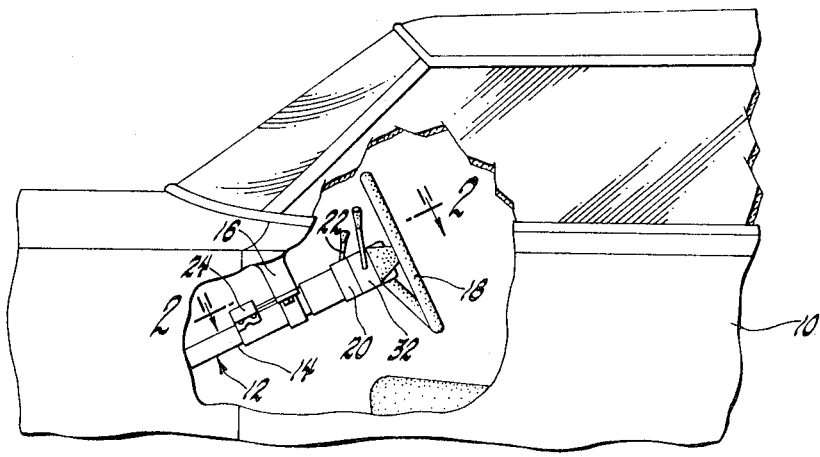
Fig.1
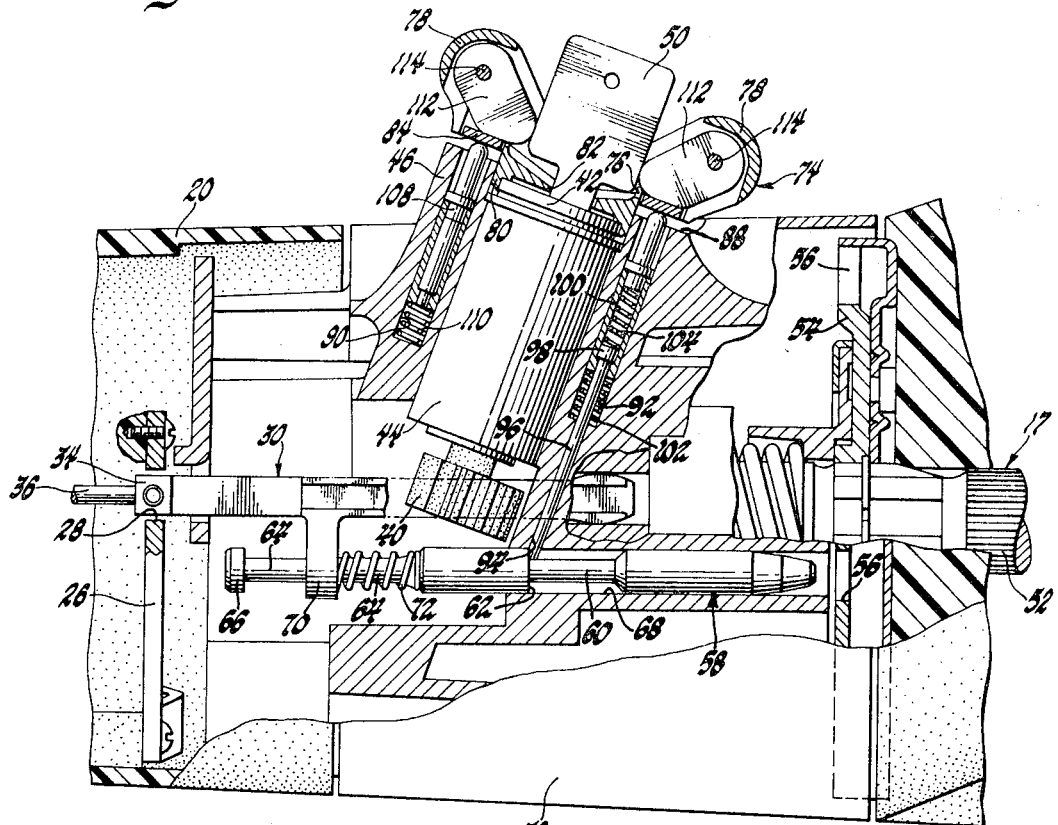
Fig.2
Fig.3
INVENTORS
Robert L. White &
John W. Creed, Jr.
BY
D. L. Ellis
ATTORNEY

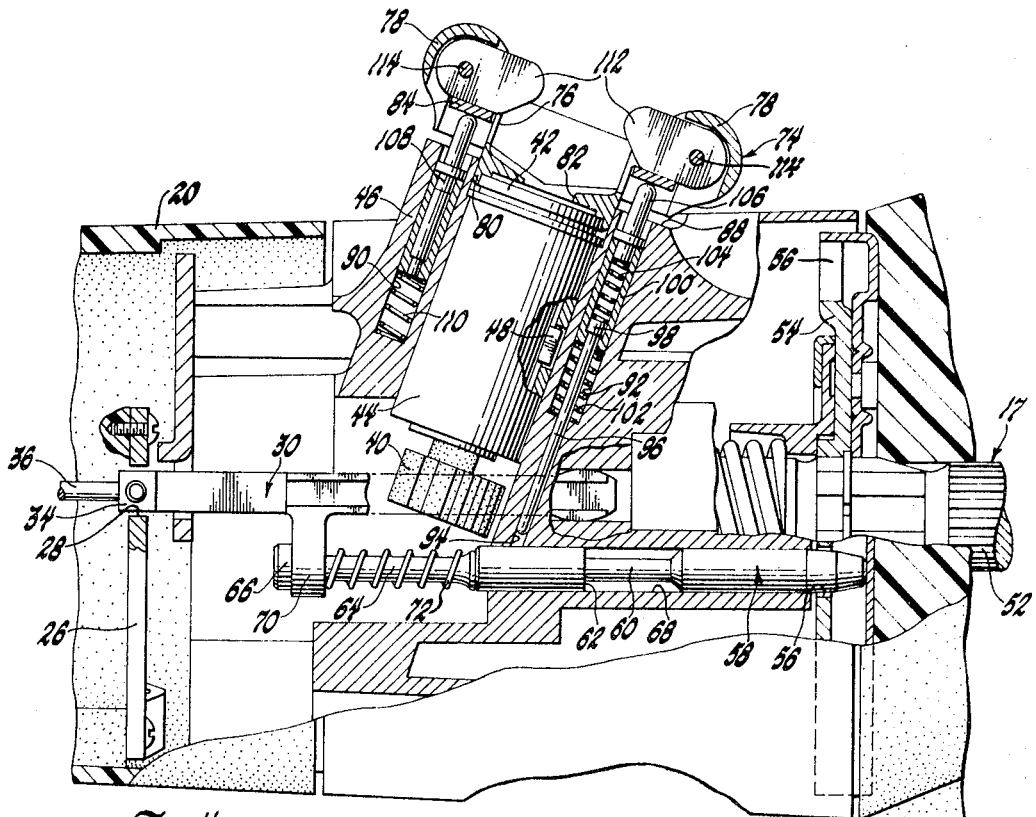

COINCIDENTAL LOCK

This invention relates generally to coincidental locks and particularly to coincidental locks adapted for vehicle steering from column applications and including means operative to prevent locking of the vehicle steering shaft as long as the key remains in the coincidental lock.

The primary feature of this invention is that it provides an improved coincidental lock particularly adapted for automotive steering column applications and incorporating means preventing return movement of the steering shaft lock bolt to locking position as long as the key remains in the lock. Another feature of this invention is that it provides a coincidental lock wherein the lock bolt movement-inhibiting means includes cam means on a lock cylinder bezel operative to sense the presence of a key in the lock cylinder through engagement on a side edge of the key and, through appropriate linkage, operative to urge an inhibitor into a blocking position wherein the latter prevents movement of the steering shaft lock bolt to a locking position as long as the key remains inserted in the lock cylinder. Still another feature of this invention resides in the provision of a slipring between the cam means on the bezel and the inhibitor pin which slipring functions to maintain the connection between the cam means and the inhibitor pin as the bezel is rotated with the lock cylinder through various angular positions corresponding to the various modes of operation of the vehicle's ignition switch.

These and other features of this invention will be readily apparent from the following specification and from the drawings wherein:

FIG. 1 is a fragmentary partially broken away elevational view of an automotive vehicle body including a steering column and a steering column coincidental lock therefor according to this invention;

FIG. 2 is an enlarged partially broken away view taken generally along the plane indicated by lines 2—2 in FIG. 1 and showing the key in inserted position in the lock cylinder;

FIG. 3 is a fragmentary perspective view of a portion of FIG. 2 showing the steering shaft lock bolt and the shift tube bolt;

FIG. 4 is a view similar to FIG. 2 but with the key withdrawn from the lock cylinder;

FIG. 5 is a view similar to FIG. 2 but with the lock cylinder rotated 90° from the position shown in FIG. 2, and FIG. 6 is a sectional view taken generally along the plane indicated by lines 6—6 in FIG. 5.

Referring now particularly to FIG. 1 of the drawings, a vehicle body 10 includes a steering column structure 12 mounted in the forward passenger compartment and extending through the body firewall to the vehicle engine compartment, not shown. The steering column structure, as conventional, includes an outer support column or tube structure 14 mounted on the body 10 by means of a bracket 16 on the instrument panel structure of the body and additionally by a similar bracket or fastening on the firewall structure of the body. The support column 14 conventionally rotatably mounts therewithin the vehicle steering shaft 17 which carries at its upper end a steering wheel 18, and the rotatable power transmission range selector tube which carries at its upper end a shift bowl 20 having a selector lever 22.

Reference may be made to U.S. Pat. Wight, et al. 3,490,255, issued Jan. 20, 1970 and assigned to the assignee of this invention, for a more complete understanding of the general type of steering column coincidental lock disclosed herein, but generally the lock includes provisions for selective prevention of rotation of the shift bowl 20 and shift tube out of some predetermined selected range of the vehicle transmission, such as "park" or "reverse," while simultaneously preventing rotation of the steering shaft. Coincidentally therewith, an ignition switch 24 mounted on the support column 14 is placed in an inoperative condition during the locked conditions of the shift tube and the steering shaft. Specifically, the shift bowl 20 carries thereon a keeper plate 26 notched at 28 for reception of a longitudinally slidable shift tube bolt 30 which is suitably mounted for such slidable movement in a channel within a die-cast or similarly constructed stationary housing portion 32 of the steering column, the latter being fixed to the support column 14. Upon selected rotation of the shift bowl 20 and shift tube to the selected or predetermined transmission condition, such as "prak," the notch 28 on the keeper plate 26 is accordingly aligned with the path of movement of the bolt 30 so that the bolt may be reciprocated to locked position, shown in FIG. 2, placing a locking projection or lug 34 of the bolt in the notch and preventing rotation of the shift bowl from such position. A switch-actuating rod 36 is attached to the end of bolt 30 and extends to the ignition switch 24, such as shown in FIG. 1, for operating the ignition switch between "off" and "on" conditions simultaneously with reciprocation of the bolt 30 between locked and unlocked positions. Further, in the case of additional circuitry in ignition switch 24 such as for a starter motor for the vehicle engine or an accessory switch position, added travel in the reciprocating path is provided in bolt 30 to accomplish these switch functions. The bolt 30 is selectively moved in its path between the various above-noted positions by a rack and sector connection including a rack 38 integral with the bolt and a toothed sector 40 rotatable as a unit with the lock cylinder 42 mounted in a sleeve 44, the sleeve being rigidly secured to the housing 32 within a boss 46 thereof. The lock cylinder is of generally conventional structure with a series of key-operable tumblers and a side locking bar 48, FIG. 4, extensible by key withdrawal to selectively lock the cylinder in a fixed rotary position within sleeve 44.

Upon insertion of a suitable coded key 50 into the lock cylinder 42, the side bar is withdrawn to allow rotation of the lock cylinder from the locked position, FIGS. 2 and 4, to a position rotating the sector 40 to cause translation of the bolt 30 leftwardly to the position shown in FIG. 5, removing the lug 34 from notch 28, and simultaneously moving the ignition switch 24 to "on" or "start" conditions. Rotation of the lock cylinder 42 by the key in the opposite direction returns the bolt 30 rightwardly and, assuming the shift bowl 20 located in the predetermined "park" or like condition, lug 34 enters the notch 28 and the ignition switch 24 is placed in "off."

Coincidentally with these locking and unlocking functions respective to the shift bowl 20 and the ignition switch 24, the steering shaft 28 is placed in locked or unlocked condition. Mounted on the upper end of the steering shaft 17 by spline or like connection 52 is a hub of a steering shaft keeper plate 54. The peripheral edge portions of the keeper plate are provided with a series of keeper recesses or notches 56 for receiving the head of a steering shaft lock bolt 58. The lock bolt 58 includes a central portion 60 of reduced diameter bounded on one end by a shoulder 62 and a similar end portion 64 of reduced diameter, the end portion 64 being bounded by an enlarged retainer 66. The lock bolt 58 is closely slidably fitted within a suitable bore 68 of the housing 32 for slidable movement between a locking position as shown in FIG. 4, and an unlocking position, FIGS. 2 and 5. Bolt 58 is moved through these positions by a connection with the shift tube bolt 30 including a fork 70 of the latter hooked over the end portion 64 of the lock bolt and engaged on one side by one end of a coil compression spring 72 bearing at its other end on a shoulder of the lock bolt 58. Accordingly, upon rotation of the lock cylinder 42 from the locked position, moving the shift tube bolt 30 leftwardly, the fork 70 thereof engaged with the retainer 66 on lock bolt 58 carries the latter leftwardly also and removes the lock bolt from locking to unlocking position. Opposite rotation of the lock cylinder 42 back to locked condition moves the bolt 30 rightwardly and the fork 70 carries the lock bolt 58 rightwardly through force exerted through the compression spring 72.

The coincidental lock according to this invention further includes means operative to inhibit return movement of the steering shaft lock bolt 58 from the unlocking to locking position thereof so long as the key 50 remains inserted in the lock cylinder and regardless of the angular position of the latter. As best seen in FIGS. 2, 4, 5 and 6, the inhibitor means includes, first, a bezel member 74 having a central cylindrical cavity 76 therein flanked on opposite sides by a pair of diametrically opposed planar gripping lugs 78. The bezel is rigidly attached to he lock cylinder 42 for unitary rotation therewith by conventional means, as by spinning the lower edge 80 of the bezel over a flange on the lock cylinder, with a key-receiving aperture 52, FIGS. 4 and 5, in the bezel at the bottom of cavity 76 being aligned with the key slot, not shown, in the lock cylinder.

As seen best in FIG. 5, a flat annular slipring 84 encircles the cylindrical cavity 76 of the bezel and is generally vertically reciprocable relative thereto between a raised position, FIG. 4, generally abutting the underside of a flange 86 integral with the bezel and extending around the cavity and a lowered position, FIGS. 2 and 5, located slightly above a flat annular surface 88 of the boss 46 on housing 32. Immediately below the slipring 84 at diametrically opposed locations relative to the sleeve is a pair of bores 90 and 92 in the housing 32, the lower end of bore 92 communicating with steering column lock bolt bore 68 through a reduced diameter bore 94, FIG. 5.

Referring to FIGS. 2, 3 and 4, an inhibitor pin 96 having an enlarged head 98 at one end thereof is slidably received in reduced diameter bore 94 and in a hollow cylindrical member 100 slidably supported in the bore 92. A first spring 102 is coiled about the inhibitor pin 96 and bears at one end against the lower end of bore 92 and at the other end against the lower end of cylindrical member 100 and thus yieldingly urges the inhibitor pin and the cylindrical member upward in the bore 92. A second spring 104 is disposed within the cylindrical member 100 and seats at one end against the top of the enlarged head 98 of the inhibitor pin and at the other end against a pin 106 rigidly affixed to and closing the upper end of the cylindrical member 100, the spring 104 urges the inhibitor pin and cylindrical member in opposite directions with enlarged head 98 normally abutting bottom of the cylindrical member. A balance plunger 108 is slidably received in bore 90 and traps in the latter a spring 110 which functions to yieldingly urge the balance plunger upward. The balance plunger 108 and pin 106 engage the underside of the slipring 84 and yieldingly urge the latter upward to the raised portion thereof.

The inhibitor means further includes key-sensitive cam means in the form of a pair of identical cam plates 112 supported in respective ones of the lugs 78 on a pair of pivot pins 114 for pivotal movement between first positions, FIG. 5, wherein a portion of each cam plate projects into cavity 76 above the key slot and second positions, FIG. 2, abutting opposite side edges of the key in the inserted position of the latter. Each cam plate includes a cam surface engageable on the upper surface of slipring 84. As seen best in FIG. 5, the gripping lugs 78 and cam plates 112 are situated generally in the plane of the key slot in the lock cylinder so that opposite side edges of the key, upon insertion thereof into the lock cylinder key slot, engage the edges of the cam plates projecting into cavity 76 and forcibly rotate the cam plates from the first to the second positions which rotation, through the cam edges, simultaneously depresses the slipring from the raised to the lowered position, the key maintaining the cam plates and slipring, respectively, in the second and lowered positions until withdrawn from the lock cylinder.

A typical operational sequence of the inhibitor means normally begins with the elements thereof in the respective positions shown in FIG. 5 and corresponding to the locked and key-withdrawn condition of the coincidental lock. When the key 50 is inserted to withdraw the side bar 48 the cam plates, through the slipring, simultaneously depress the balance plunger 108 and the pin 106 and cylindrical member 100. Initially, the inhibitor pin 96 moves downward as a unit with the pin and cylindrical member until the leading edge of the inhibitor pin engages the outside diameter of the steering shaft lock bolt 58 whereupon continued depression of the slipring initiates compression of spring 104 in the cylindrical member and relative axial movement between the latter and inhibitor pin. When the key is fully inserted, the inhibitor pin is yieldingly urged by spring 104 against the lock bolt 58.

The gripping lugs 78 and key 50 are then grasped as a unit and rotated to the ignition switch-activating position, FIG. 6, whereupon the lock bolt 58 is withdrawn from the locking to the unlocking position wherein central portion 60 of the lock bolt generally underlies the terminus of reduced bore 94 in the housing. As the lock bolt achieves the unlocking position, the inhibitor pin 96 is projected behind shoulder 62 on the lock bolt and is resiliently maintained therebehind by the spring 104 in the cylindrical member.

Once the steering shaft lock bolt 58 has been withdrawn to the unlocking position as described, the inhibitor pin maintains the lock bolt in that position regardless of any subsequent angular movement of the lock cylinder and key. More particularly, referring to FIGS. 2 and 5, when the key 50 and lock cylinder 42 are rotated from the normal running positions, FIG. 5, to the systems-locking positions, FIG. 2, the slipring 84 rotates as a unit with the bezel 74 and slides over the balance plunger 108 and pin 106 while continuing to maintain the latter two elements depressed so that the inhibitor pin is held behind shoulder 62 on the lock bolt 58. Consequently, as the shift tube lock bolt 30 is returned to its locking position, FIG. 2, the spring 72 is compressed against fork 70, the compression being resisted by the inhibitor pin 96. When the key 50 is finally withdrawn from the lock cylinder the restraint is removed from spring 102 and 110 which then initiate upward movement of the slipring to the raised position. The inhibitor pin, of course, moves upwardly with the slipring and is removed from blocking position in front of the shoulder 62 and the lock bolt 58 is then projected by spring 72 into locking position in the keeper plate 54. The slipring also functions, upon movement to the raised position, to pivot the cam plates 112 back to the first position thereof operative to initiate another operational sequence of the inhibitor means upon reinsertion of the key 50.

Having thus described the invention, what is claimed is:

1. In an automotive steering column structure including, a support column mounted on the vehicle, a steering shaft rotatably mounted within said support column and operatively connected to the vehicle-steering gear, a keeper plate fixed to said steering shaft for unitary rotation therewith in a plane extending generally transversely of said support column, a steering shaft lock bolt supported on said support column for bodily movement longitudinally of the latter between a locking position engaging said keeper plate and preventing movement of said steering shaft and an unlocking position remote from said keeper plate, lock means including a sleeve rigidly attached to said support column and a lock cylinder supported on said sleeve for rotary movement and normally secured thereagainst but adapted to receive a key by which said lock cylinder is freed for rotary movement between a plurality of angular positions, and means connecting said lock cylinder to said lock bolt and operative in response to rotary movement of said lock cylinder to move said lock bolt between the locking and the unlocking positions, the combination comprising, a bezel, means supporting said bezel on said lock cylinder for unitary rotation therewith, an inhibitor pin, means supporting said inhibitor pin on said support column for bodily movement between a blocking position in the unlocking position of said lock bolt engaging the latter and preventing movement thereof to the locking position and an unlocking position remote from said lock bolt, slipring means, means supporting said slipring means on one of said support column and said bezel for movement between a raised position and a lowered position, spring means between said slipring means and said inhibitor pin operative in the lowered position of said slipring means to yieldingly urge said inhibitor pin toward the blocking position thereof, cam means, means supporting said cam means on said bezel for movement between a first position and a second position, said cam means in the first position thereof being engageable on said key in response to insertion of the latter in said lock cylinder and said key thereafter being operative to move said cam means from the first to the second position thereof and to maintain said cam means in the second position, and means connecting said cam means to said slipring means in every angular position of said lock cylinder so that said cam means is operative in the second position thereof to maintain said slipring means in the lowered position thereof.

2. The combination as recited in claim 1 wherein said cam means includes a cam plate having a cam surface thereon, and means supporting said cam plate on said bezel for pivotal movement between the first and the second position about an axis of the latter extending generally transversely of the plane of said key in the inserted position thereof in said lock cylinder, said cam surface being engageable on said slipring means and operative to move said slipring means from the raised to the lowered position thereof in response to pivotal movement of said cam plate from the first to the second position.

3. In an automotive steering column structure including, a support column mounted on the vehicle, a steering shaft rotatably mounted within said support column and operatively connected to the vehicle-steering gear, a keeper plate fixed to said steering shaft for unitary rotation therewith in a plane extending generally transversely of said support column, a steering shaft lock bolt supported on said support column for movement longitudinally of the latter between a locking position engaging said keeper plate and preventing movement of said steering shaft and an unlocking plate and preventing movement of said steering shaft and an unlocking position remote from said keeper plate, lock means including a sleeve rigidly attached to said support column and a lock cylinder supported on said sleeve for rotary movement and normally secured thereagainst but adapted to receive a key by which said lock cylinder is freed for rotary movement between a plurality of angular positions, and means connecting said lock cylinder to said lock bolt and operative in response to rotary movement of said lock cylinder to move said lock bolt between the locking and unlocking positions, the combination comprising, a bezel having a central key-receiving aperture therein and a pair of planar gripping lugs disposed on opposite sides of said aperture, means supporting said bezel on said lock cylinder for unitary rotation therewith, said key in the inserted position thereof in said lock cylinder projecting through said aperture in said bezel and being disposed between said gripping lugs generally in the plane thereof, and inhibitor pin, means supporting said inhibitor pin on said support column for bodily movement in opposite directions generally transversely of said support column between a blocking position in the unlocking position of said lock bolt engaging the latter and preventing movement thereof to the locking position and an unblocking position remote from said lock bolt, first spring means on said support column yieldingly urging said stop inhibitor pin toward the unblocking position thereof, an annular slipring, means supporting said annular slipring on said bezel for unitary rotary movement therewith and for axial movement relative thereto between a raised position and a lowered position, second spring means engageable on said support column and slidably engageable on said slipring, said second spring means being operative in response to forced movement of said slipring from the raised to the lowered position to overcome said first spring means and yieldingly urge said inhibitor pin toward the blocking position thereof, a cam plate, and means supporting said cam plate on one of said gripping lugs for pivotal movement relative to the latter about an axis extending generally transversely of the plane of said gripping lugs between first and second positions and for engagement on a side edge of said key and on said slipring, said cam plate in the first position thereof being engageable on said key in response to insertion of the latter in said lock cylinder and said key thereafter being operative to pivot said cam plate from the first to the second position thereof and to maintain said cam plate in said second position, said cam plate being operative upon movement to the second position to move said slipring to the lowered position thereof and to maintain said slipring in the lowered position.

\* \* \* \* \*